United States Patent [19]
Aramaki

[11] Patent Number: 5,848,039
[45] Date of Patent: Dec. 8, 1998

[54] METHOD FOR CALCULATING A PLAY TIME OF A DISC REPRODUCING APPARATUS

[75] Inventor: Junichi Aramaki, Chiba, Japan

[73] Assignee: Sony Corporation, Tokyo, Japan

[21] Appl. No.: 98,692

[22] Filed: Jun. 17, 1998

Related U.S. Application Data

[63] Continuation of Ser. No. 63,512, May 18, 1993.

[30] Foreign Application Priority Data

May 22, 1992 [JP] Japan ............................... PO4-155722
Oct. 27, 1992 [JP] Japan ............................... PO4-311476

[51] Int. Cl.$^6$ ....................................................... C11B 7/00
[52] U.S. Cl. ................................. 369/58; 369/32; 369/47; 369/59
[58] Field of Search ................................. 369/58, 47, 48, 369/49, 50, 54, 59, 32

[56] References Cited

U.S. PATENT DOCUMENTS

| | | |
|---|---|---|
| 4,862,439 | 8/1989 | Ando et al. . |
| 4,916,682 | 4/1990 | Tomoda et al. . |
| 5,099,464 | 3/1992 | Maeda . |
| 5,142,521 | 8/1992 | Terashima et al. . |
| 5,153,861 | 10/1992 | Maeda et al. . |
| 5,214,631 | 5/1993 | Maeda et al. . |
| 5,224,087 | 6/1993 | Maeda et al. . |
| 5,243,588 | 9/1993 | Maeda et al. . |
| 5,274,617 | 12/1993 | Terashima et al. . |
| 5,388,093 | 2/1995 | Yoshida et al. . |
| 5,392,265 | 2/1995 | Takezawa et al. . |

FOREIGN PATENT DOCUMENTS

| | | |
|---|---|---|
| 0 472 414 A1 | 2/1992 | European Pat. Off. . |
| 0 540 164 A1 | 5/1993 | European Pat. Off. . |
| 2 529 004 | of 1983 | France . |
| 2 123 599 | 2/1984 | United Kingdom . |

OTHER PUBLICATIONS

Patent Abstracts of Japan, vol. 17, No. 215 (P–1527), 27 Apr. 1993 & JP–A–04 351780 (Sony Corporation), 7 Dec. 1992.
*Mini Disc System Technical Manual*, published Mar. 1992, Sony Corporation, Audio Development Group, Tokyo, Japan.
Decision on Appeal Ex parte Junichi Aramaki, Appeal No. 95–4772, Application No. 08/063,512.

*Primary Examiner*—Muhammad N. Edun
*Attorney, Agent, or Firm*—Limbach & Limbach L.L.P.

[57] ABSTRACT

A method for calculating a play time of a disc reproducing apparatus is disclosed. The method comprises the steps of: reading cluster and sector information of each music program recorded on a disc after compressed; calculating cluster and sector number information of each music program according to the cluster and sector information of each music program; calculating cluster and sector number information of all music programs recorded on the disc according to the cluster and sector information of each music program; calculating remaining cluster and sector number information of a music program being reproduced according to both relative cluster and sector number information measured from the beginning of a music program being reproduced and the cluster and sector number information of each music program, or calculating remaining cluster and sector number information of the disc according to the relative cluster and sector number information measured from the beginning of a music program being reproduced, the cluster and sector number information of all music programs recorded on the disc, and the cluster and sector number information of each music program; and converting the cluster and sector number information of each music program, the cluster and sector number information of all music programs, the cluster and sector number information of a music program, or the remaining cluster and sector number information of the disc into time information so as to output the time information.

40 Claims, 6 Drawing Sheets

| BIT | MINUTE | SECOND |
|---|---|---|
| 11 | 70 | 20.68 |
| 10 | 35 | 10.34 |
| 9 | 17 | 35.17 |
| 8 | 8 | 47.58 |
| 7 | 4 | 23.79 |
| 6 | 2 | 11.89 |
| 5 | 1 | 5.95 |
| 4 | 0 | 32.97 |
| 3 | 0 | 16.49 |
| 2 | 0 | 8.24 |
| 1 | 0 | 4.12 |
| 0 | 0 | 2.06 |

Fig. 6

| BIT | MINUTE | SECOND |
|---|---|---|
| 4 | 0 | 1.03 |
| 3 | 0 | 0.52 |
| 2 | 0 | 0.26 |
| 1 | 0 | 0.13 |
| 0 | 0 | 0.06 |

Fig. 7

| BIT | MINUTE | SECOND |
|---|---|---|
| 11 | 69 | 44.79 |
| 10 | 34 | 52.40 |
| 9 | 17 | 26.20 |
| 8 | 8 | 43.10 |
| 7 | 4 | 21.55 |
| 6 | 2 | 10.77 |
| 5 | 1 | 5.39 |
| 4 | 0 | 32.69 |
| 3 | 0 | 16.35 |
| 2 | 0 | 8.17 |
| 1 | 0 | 4.09 |
| 0 | 0 | 2.04 |

Fig. 8

| BIT | MINUTE | SECOND |
|---|---|---|
| 4 | 0 | 1.02 |
| 3 | 0 | 0.51 |
| 2 | 0 | 0.25 |
| 1 | 0 | 0.13 |
| 0 | 0 | 0.06 | the disc, a TOC (Table Of Contents) is disposed. On the
METHOD FOR CALCULATING A PLAY TIME OF A DISC REPRODUCING APPARATUS This is a continuation of application Ser. No. 08/063,512, filed May 18, 1993.

BACKGROUND OF THE INVENTION

1. Field of the Invention

The present invention relates to a method for calculating a play time of a disc reproducing apparatus. More particularly, the present invention relates to a method for calculating a play time of a disc reproducing apparatus suitable for a time indication of a recording apparatus for a disc on which data has been recorded after compressed.

2. Description of the Prior Art

An optical disc system which records and reproduces digital audio signals to and from an optical disc or magnetooptical disc with a diameter of 64 mm which is housed in a disc cartridge has been developed. On an optical disc which is used in the optical disc system, with sound compression technologies, the amount of original digital audio signals is compressed to around ⅕ times thereof and recorded. Thus, using a small disc with a diameter of 64 mm, digital audio signals can be recorded and reproduced thereto and therefrom for around 74 minutes long.

In an optical disc recording and reproducing apparatus, when data is recorded, laser power should be controlled. In addition, the interleave length of CIRC (cross-interleave Reed-Solomon code) is 108 frames, which is longer than one sector. Thus, a linking area is required. Therefore, on the optical disc, signals are recorded and reproduced cluster by cluster, each cluster consisting of 36 sectors. Data is recorded to 32 sectors of one cluster consisting of 36 sectors. The remaining four sectors are used for a linking area and a subdata area.

At the time of reproducing, data is reproduced from the optical disc at a higher transmission rate than that of a decoder which decodes compressed data. The reproduction data is temporarily stored in a buffer memory. The buffer memory becomes full with digital signals by around 0.9 seconds after they are stored therein. Even if digital signals stored on the disc cannot be read due to vibration or the like, the data stored in the buffer memory is output as reproduction signals for around 3 seconds. During this time, an optical pickup is accessed again to the original position and the signals are read. Thus, the optical disc recording/reproducing apparatus can prevent so-called "sound jump".

As a reproducing apparatus of digital audio signals, a compact disc (CD) reproducing apparatus has been widely used. When a disc is loaded on the compact disc reproducing apparatus, the total play time of the disc is displayed. In addition, while each music program is reproduced, the play time of the music program and the remaining play time are displayed.

Thus, for the recording and/or reproducing apparatus of the optical disc system mentioned above, there is the same desire as the compact disc reproducing apparatus. In other words, there is the desire that when a disc is loaded on the apparatus, the total play time of the disc is displayed and that while each music program is being reproduced, the play time thereof and the remaining play time are displayed.

On the conventional compact disc, a time code is recorded on Q channel of a subcode. On the innermost periphery of the disc, a TOC (Table Of Contents) is disposed. On the TOC, an absolute time at which each music program starts is recorded. Thus, when the TOC is read, the total play time of the disc can be obtained. In addition, with the information of Q channel of a subcode, the elapsed time of each music program can be obtained. Thus, the remaining play time of the disc can be obtained. Therefore, required time indication such as indication of the total play time of the disc, indication of the play time of each music program, and indication of the remaining play time of the disc can be relatively easily performed.

However, on the optical disc, the TOC does not contain the time information. In addition, as described above, on the optical disc, the transmission rate of signals reproduced from the disc differs from that of data of the encoder which decodes compressed data. The signals reproduced from the disc are temporarily stored in a buffer memory. Thus, a signal at an address from which data is currently being reproduced does not accord with a sound which is currently reproduced. As a result, with an address at which the pickup is being currently accessed, the time information of a music program which is currently being reproduced cannot be obtained.

OBJECTS AND SUMMARY OF THE INVENTION

An object of the present invention is to provide a method for calculating a play time of a disc reproducing apparatus which allows data necessary for displaying a time to be easily calculated.

Another object of the present invention is to provide a disc reproducing apparatus which allows a time to be easily displayed according to data read out from a disc on which data has been recorded after compressed.

According to a first aspect of the present invention, there is provided a method for calculating a play time of a disc reproducing apparatus, the method comprising the steps of:

reading cluster and sector information of each music program recorded on a disc;

calculating cluster and sector number information of each music program according to the cluster and sector information of each music program;

calculating cluster and sector number information of all music programs recorded on the disc according to the cluster and sector information of each music program, calculating remaining cluster and sector number information of a music program being reproduced according to both relative cluster and sector number information measured from the beginning of a music program being reproduced and the cluster and sector number information of each music program, or calculating remaining cluster and sector number information of the disc according to the relative cluster and sector number information measured from the beginning of a music program being reproduced, the cluster and sector number information of all music programs recorded on the disc, and the cluster and sector number information of each music program; and converting the cluster and sector number information of ch music program, the cluster and sector number information of all music programs, the cluster and sector number information f a music program, or remaining cluster and sector number information of the disc into time information so as to output the time information.

According to a second aspect of the present invention, there is provided a disc reproducing apparatus for reading and reproducing data recorded on a disc by a predetermined amount of record data, the disc having a first record region and a second record region, the first record region being adapted for recording data after compressed, the second record region being adapted for recording catalog information of data being recorded in the first record region, the apparatus comprising:

a head;

a memory for storing time information;

a controller connected to the memory, for controlling the operation of the head, the controller being adapted for storing the catalog information read out from the disc by the head, for converting the catalog information into data which is necessary for reading time information stored in the memory, and for reading time information from the memory according to the converted data; and a display unit for displaying the data read out from the memory.

According to the present invention, with cluster and sector number information read out from the disc, the play time and remaining time of each music program, the play time and remaining time of the entire disc, and so forth can be displayed.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
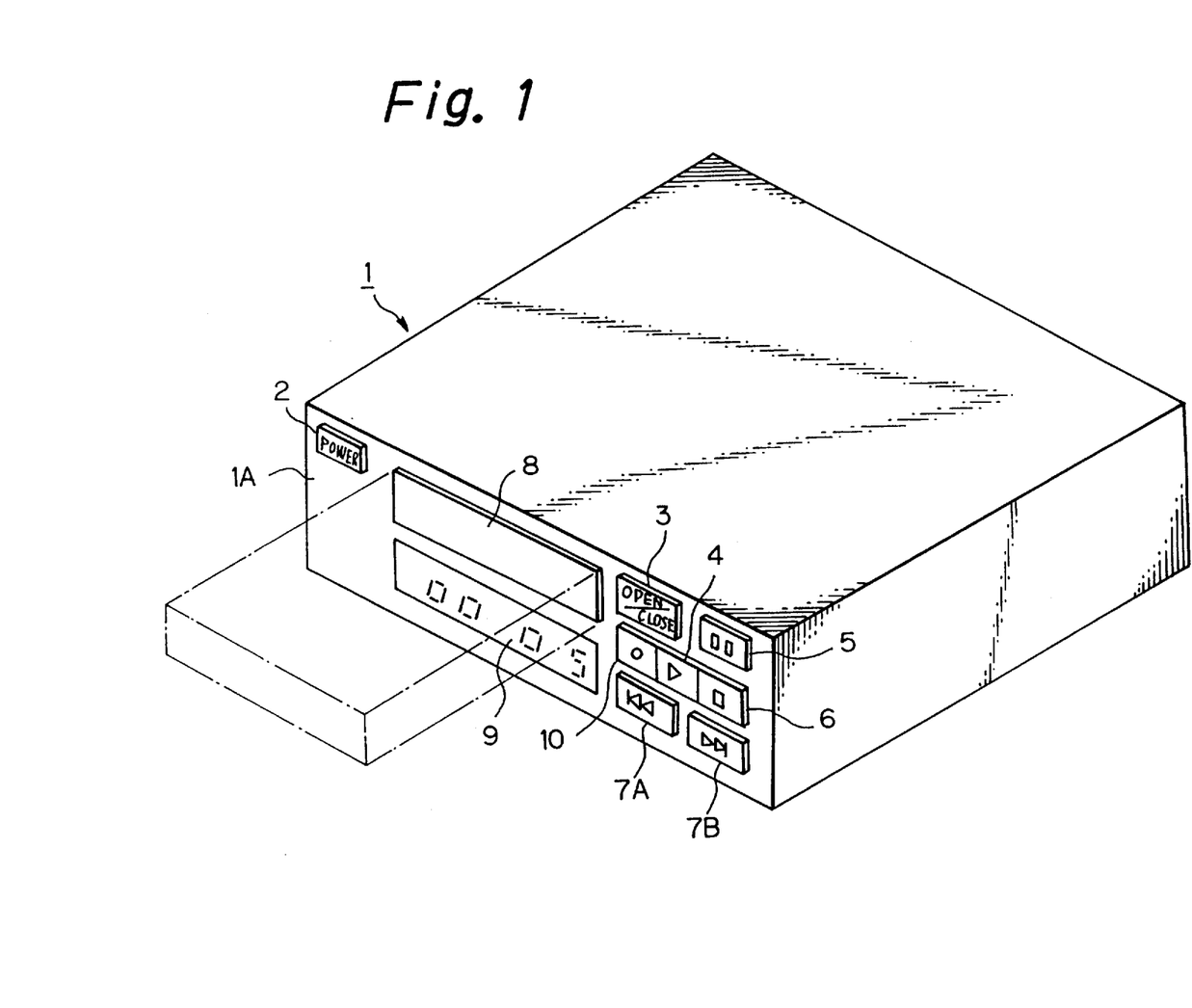
FIG. 1 is a perspective view showing the external overall construction of an optical disc recording and/or reproducing apparatus to which the present invention has been applied.

An embodiment of the present invention will now be described hereunder with reference to the accompanying drawings. FIG. 1 is a perspective view showing an external overall construction of an optical recording and/or reproducing apparatus to which the present invention has been applied. In FIG. 1, on a front panel 1A of the optical disc recording and/or reproducing apparatus 1, a display 9 is disposed. In addition, on the front panel 1A of the optical disc recording and/or reproducing apparatus 1, a power key 2, an OPEN/CLOSE key 3, a reproduction key 4, a pause key 5, a stop key 6, AMS keys 7A and 7B, and a record key 10 are disposed. Reference numeral 8 denotes a disc tray which is pulled from an opening of the front panel 1A.

When the OPEN/CLOSE key 3 is operated, the disc tray 8 is pulled out as shown by alternate long and short dash lines of the figure. On the disc tray 8, an optical disc (not shown in the figure) is mounted. When the OPEN/CLOSE key 3 is operated again, the tray 8 is pulled into the apparatus 1. The optical disc is loaded in a recording and/or reproducing portion within the apparatus 1.

On the display 9, time information such as the total play time of the optical disc being loaded, the elapsed time of a music program being reproduced, the remaining play time of the music program being reproduced, and the remaining play time of the remaining music programs and the track number of the music program being reproduced are displayed. In addition, for a disc on which a disc name and a track name which have been recorded, they are displayed on the display 9.

Figure 2:
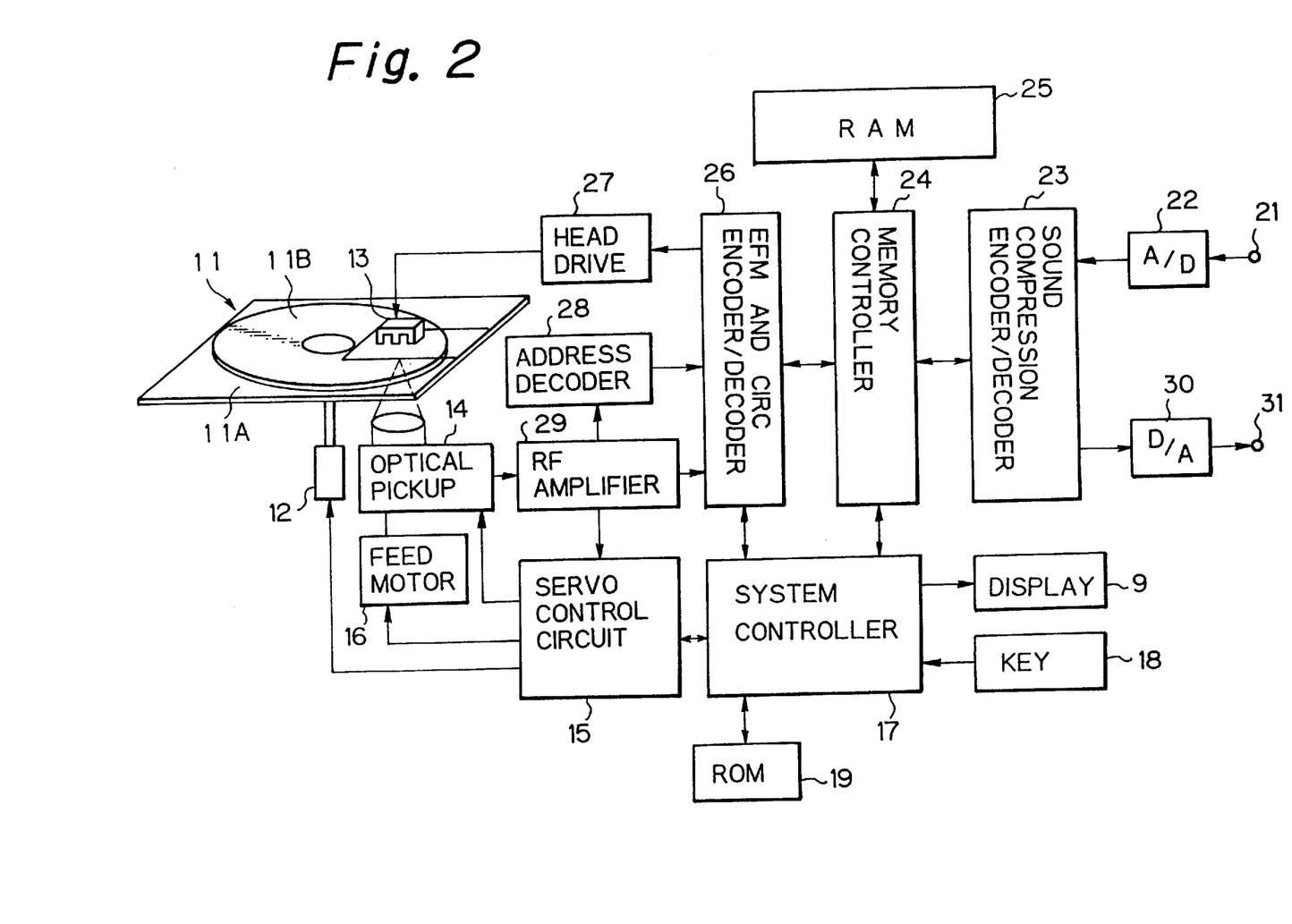
FIG. 2 is a block diagram showing the construction of the optical disc recording and/or reproducing apparatus to which the present invention has been applied.

FIG. 2 is a block diagram showing the construction of an optical disc recording and/or reproducing apparatus to which the present invention has been applied. Reference numeral 11 indicates a disc cartridge. In a cartridge 11A, an optical disc 11B with a diameter of 64 mm is housed. There are three types of optical discs which are a reproduction-only optical disc, a recordable magnetooptical disc, and an optical disc which has both a reproduction-only region and a recordable region. In this example, it is assumed that a magnetooptical disc is housed in the disc cartridge 11.

On the optical disc 11B, a pregroove which is wobbled in the radial direction of the disc are formed according to address data. Data is recorded on or read from the optical disc 11B according to address data which is obtained by detecting the pregroove. As will be described in detail later, a record region of the optical disc 11B comprises a first record region in which data according to information such as conventional music signals are recorded and a second record region. In which catalog information such as so-called TOC (Table Of Contents) is recorded. Record data according to a plurality of programs and a plurality of music programs are recorded on the optical disc 11B along the pregroove.

Reference numeral 12 denotes a spindle motor which rotates the optical disc 11B at a constant linear velocity. The spindle motor 12 is controlled by a servo control circuit 15 which will be described later. Reference numeral 13 indicates a magnetic head which generates an external magnetic field. The magnetic head 13 applies a vertical magnetic field which is modulated according to data to be recorded on the optical disc 11B. Reference numeral 14 denotes an optical pickup which irradiates a light beam onto the optical disc 11B. The magnetic head 13 and the optical pickup 14 are oppositely disposed through the optical disc 11B. The magnetic head 13 and the optical pickup 14 are connected with a connection mechanism (not shown in the figure). Thus, the magnetic head 13 and the optical pickup 14 are integrally traveled in the radial direction of the optical disc 11B. Reference numeral 15 indicates a servo control circuit. The servo control circuit 15 generates error signals such as a focusing error signal and a tracking error signal according to output signals of the optical pickup 14 obtained through an RF amplifier 29 which will be described later. The servo control circuit 15 supplies control signals for performing focusing servo control and tracking servo control to the optical pickup 14 based on the generated error signals.

Reference numeral 16 denotes a feed motor which travels the optical pickup 15 in the radial direction of the optical disc 11B. The feed motor 16 travels the optical pickup 14 according to a feed signal received from the servo control circuit 15 so as to allow the optical pickup 14 to perform a track jump operation. In addition, the feed motor 16 receives a low frequency component of the tracking error signal supplied from the servo control circuit 15. When the optical pickup 14 is traveled in the radial direction of the optical disc 11B by the feed motor 16, the magnetic head 13 is also traveled in the radial direction of the optical disc 11B.

Reference numeral 17 shows a system controller which controls the operation of each constructional portion. The system controller 17 is connected to a display 9 and an input key 18. The input key 18 accords with the power key 2, the OPEN/CLOSE 3, the play key 4, the pause key 5, the stop key 6, the music program selection keys 7A and 7B, and the record key 10 which are disposed on the front panel 1A shown in FIG. 1. On the display 9, there is displayed the catalog information of the optical disc 11B, for example, time information such as total play time, play time of a music program or a program which is being played and, remaining time, and track number, disc name and track name of a music program or a program being played is displayed. The system controller 17 is provided with a timer circuit.

Reference numeral 19 is a memory which comprises an ROM (Read Only Memory). As will be described later, the memory 19 stores time information according to the cluster and sector number. The ROM 19 is connected to the system controller 17. The time information stored in the ROM 19 is read out with data according to the cluster and sector number (namely, address data) obtained by the system controller 17.

Reference numeral 21 denotes an input terminal. Reference numeral 22 indicates an A/D converter which converts an analog audio signal received from the input terminal 21 into a 16-bit digital signal. The sampling frequency of the A/D converter 22 is 44.1 kHz. Reference numeral 23 shows a sound compression encoder/decoder. The sound compression encoder/decoder 23 compresses the amount of the digital signal supplied from the A/D converter 22 to around ⅕ times thereof. The sound compression encoder/decoder 23 compresses and expands the signal with modified DCT (Discrete Cosine Transform) technique. Reference numeral 24 denotes a memory controller which controls data write operation to a memory 25 and data read operation therefrom. The memory 25 is for example a dynamic RAM with a storage capacity of 1 Mbits. The memory 25 temporarily stores data received from the sound compression encoder/decoder 23 through the memory controller 24 when data is recorded on the optical disc 11B. When data is reproduced from the optical disc 11B, data received from an EFM (Eight to Fourteen Modulation) and CIRC (Cross Interleave Reed-Solomon Code) encoder/decoder 26 is temporarily stored in the memory 25 through the memory controller 24. The EFM and CIRC encoder/decoder 26 performs an error correction process for the data being read from the memory 25. In addition, the EFM and CIRC encoder/decoder 26 performs an EFM operation for data. CIRC is used as an error correction code.

Reference numeral 27 indicates a drive circuit for the magnetic head 13. The drive circuit 27 receives record data from the EFM and CIRC encoder/decoder 26. Reference numeral 28 denotes an address decoder which decodes an address signal which has been recorded as a wobbled groove according to a reproduction signal supplied from an RF amplifier 29. Reference numeral 30 indicates a D/A converter which converts a digital signal expanded by the sound compression encoder/decoder 23 into an analog audio signal. The analog audio signal is output from an input terminal 31.

To record data on the optical disc 11B, the optical pickup 14 irradiates a light beam in record level onto the optical disc 11B so as to heat a record layer thereof which is a magnetooptical record layer in this example. At this point, a vertical magnetic field according to the record data is applied from the opposite surface of the optical disc 11B. The magnetooptical record layer as the record layer is magnetized in the direction of the vertical magnetic field when the temperature lowers as the optical beam moves. As a result, data is recorded on the optical disc 11B. In order to read data from the optical disc 11B, a light beam having a power lower than that at the time of recording is irradiated on the optical disc 11B. the light beam is reflected by the magnetooptical record layer as the optical record layer of the optical disc 11B. The reflected light beam is detected by a pair of photodetectors of the optical pickup 14. Reproduction signal of the optical disc 11B can be obtained by obtaining the difference between output signals from the pair of photodetectors.

Data is recorded cluster by cluster on the optical disc 11B. One cluster consists of 36 sectors. One sector consists of 98 frames corresponding to one subcode block of a compact disc. When data is recorded, the power of the light beam irradiated from the optical pickup 14 should be controlled. In addition, the interleave length of CIRC is 108 frames, which is longer than the length of one sector. Thus, a linking area is required. The first three sectors of one cluster, namely, 36 sectors are used for linking sectors. The next one sector is used for subdata. Thus, compressed digital data of one cluster, namely, 36 sectors is recorded to 32 sectors.

The position at which data is recorded is designated by addresses wobble-recorded in a groove disposed in the disc 11. The addresses wobble-recorded in the groove are detected by an address decoder 28. The addresses detected by the address decoder 28 are supplied to the EFM and CIRC encoder/decoder 26.

When data is reproduced, a record signal on the optical disc 11B is reproduced by the optical pickup 14. The reproduction signal on the optical disc 11B is reproduced cluster by cluster. The reproduction signal is supplied to the EFM and CIRC encoder/decoder 26 through an RF amplifier 29. At this point, the optical pickup 14 reads the digital signal on the optical disc 11B at a transmission rate of 1.4 Mbits/sec. The digital signal which is read from the optical disc 11 is sent to the EFM and CIRC encoder/decoder 26. The EFM and CIRC encoder/decoder 26 performs an EFM demodulation and an error correction process for the input digital signal.

The output signal of the EFM and CIRC encoder/decoder 26 is sent to the memory 25 through the memory controller 24. The memory 25 temporarily stores the input signal. The output signal of the memory 25 is supplied to the sound compression encoder/decoder 23. The sound compression encoder/decoder 23 expands the audio signal.

When the sound compression encoder/decoder 23 receives data at a transmission rate of 300 kbits/sec, it can decompress the input signal and reproduce a continuous sound. On the other hand, as described above, the optical pickup 14 reads a digital signal from the optical disc 11B at a transmission rate of 1.4 Mbits/sec. When the memory 25 has a storage capacity of 1 Mbits, it becomes full in around 0.9 seconds. Even if a digital signal cannot be read from the optical disc 11B due to vibration or the like the reproduction signal can be continuously output for around 3 seconds with the use of data stored in the memory 25. During this time, the optical pickup 14 can be accessed again to the original position so as to read the data again. Thus, so-called "sound jump" can be prevented.

Data decompressed by the sound compression encoder/decoder 23 is supplied to a D/A converter 30. The D/A converter 30 restores the input signal to an analog signal. The analog audio signal is output from the output terminal 31.

Figure 3:
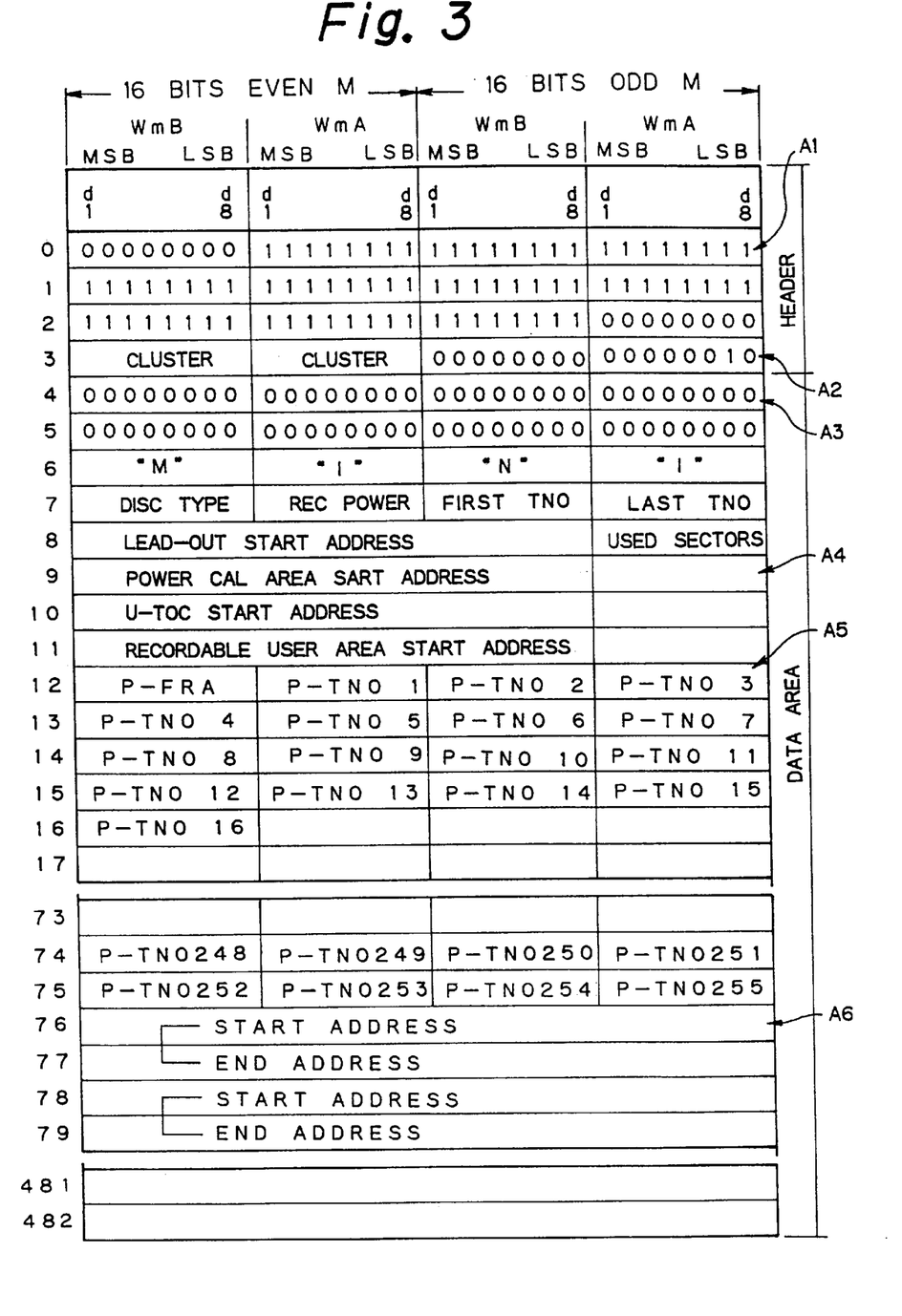
FIG. 3 is a schematic diagram for explaining a TOC for use with the optical disc system to which the present invention has been applied.

On the innermost periphery of the optical disc 11B, a TOC (Table Of Contents) is disposed. On the TOC, information of data recorded on the optical disc 11B is recorded. FIG. 3 shows the construction of the TOC. The TOC consists of a header area and a data area. The header area starts with a fixed sync pattern area A1. The sync pattern area A1 is followed by a header information area A2 which represents a cluster and a sector.

The data area starts with a fixed pattern area A3. The pattern area A3 is followed by an identification information area A4 which contains a mini disc identifier, a disc type identifier indicating which of, for example, reproduction only type, recordable type, or hybrid type having reproduction-only area and recordable area, a record power, a start track number, a last track number, a lead-out start address, a use sector, a power calibration start address, a user TOC start address, and a readable user area start address. The identification information area A4 is followed by a track number point area A5 which contains P-TNO1, P-TNO2, P-TNO3, . . . , etc. The track number points (P-TNO1, P-TNO2, P-TON3, . . . , etc.) are pointers which represent addresses of information of the start address and end address of each track number. The track number point area A5 is followed by a track information area A6. The information of the start address and end address of each track is recorded on the track information area A6. The addresses of information of the start address and end address of each track are designated by track number points (P-TNO1, P-TNQ2, P-TNO3, . . . , etc.).

Figure 4:
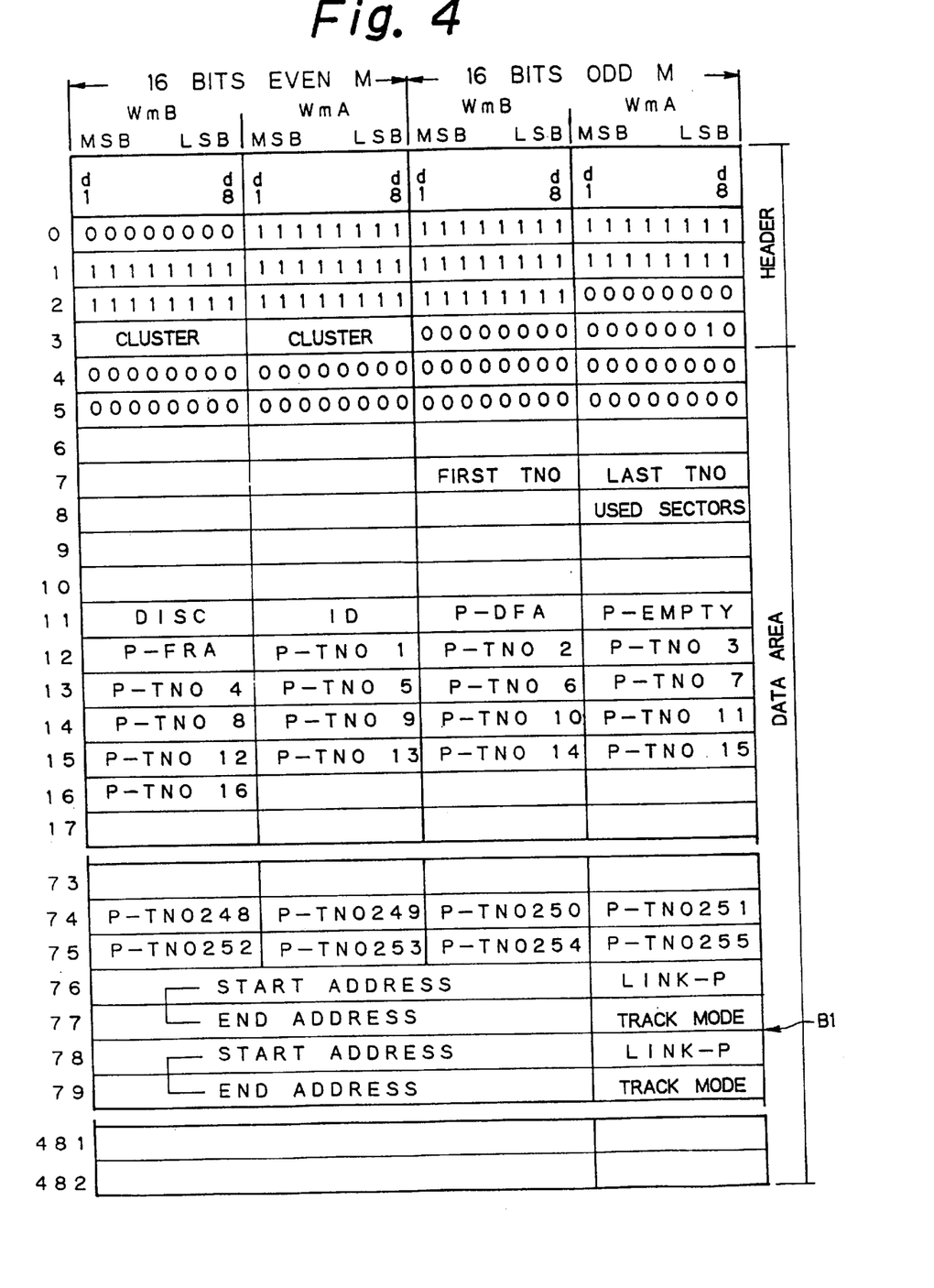
FIG. 4 is a schematic diagram for explaining a user TOC for use with the optical disc system to which the present invention has been applied.

In addition, to manage an audio signal being recorded, the optical disc 11B is provided with a user TOC. FIG. 4 shows the construction of the user TOC. The basic construction of the user TOC is the same as that of the above-mentioned TOC. The user TOC contains information named Link-P (denoted by B1) as track information. The Link-P represents a track which is preceded by a relevant track. Thus, to change the sequence of music programs, it is not necessary to change the sequence of tracks. In other words, all track information can be managed on the user TOC.

When a disc is loaded, the information of the TOCs is stored at part of the memory 25. The user TOC is updated in the memory 25. For example, when a disc is ejected, the updated user TOC is recorded on the optical disc 11B.

According to the embodiment of the present invention, time information such as the total play time of the optical disc 11B, the elapsed time of a music program being reproduced, the remaining play time of the music program being reproduced, and the remaining play time of the remaining music programs is obtained as follows.

As described above, on the innermost periphery of the optical disc 11B, the TOC area is disposed as shown in FIG. 3. When the optical disc 11B is loaded into the recording and/or reproducing apparatus, the information of TOC is read by the optical pickup 14 and stored at part of the memory 25.

With the information of the TOC stored in the memory 25, the system controller 17 first obtains the total numbers of clusters and sectors for each music program. In other words, by subtracting the information of the start address from the information of the end address of each track in the track information area A6 of the TOC, the numbers of clusters and sectors for each music program can be obtained.

Next, the total numbers of clusters and sectors of the optical disc 11B are obtained by cumulating the total numbers of clusters and sectors for each music program.

When the disc is loaded, the total numbers of clusters and sectors of the disc are converted into time information by a method which will be described later. This time information is displayed on the display 9.

While data is being reproduced from the disc, a relative cluster number and a relative sector number which are measured from the beginning of a music program being reproduced are obtained by counting the number of transmission requests for transmitting data stored in the memory 25 to the sound compression encoder/decoder 23 through the memory controller 24. In other words, when a music program is reproduced from the disc, data stored in the memory 25 is sent to the sound compression encoder/decoder 23 through the memory controller 24 sector by sector as shown in FIG. 2. The system controller 17 sends data of one sector from the memory 25 to the sound compression encoder/decoder 23. Thereafter, when the sound compression encoder/decoder 23 issues a transmission request for the next sector, the information of the next sector is sent from the memory 25 to the sound compression encoder/decoder 23. Thus, when the reproduction of the music program is started, the cluster number and the sector number of a counter provided in the system controller 17 are initially set to 0. Whenever this transmission request is issued, the cluster number and the sector number are incremented. Thus, the relative cluster number and the sector number measured from the beginning of the music program being reproduced can be obtained.

While a music program is being reproduced, with the relative cluster number and the relative sector number thus obtained, the elapsed time of the music program can be obtained by the system controller 17. This elapsed time is displayed on the display 9. In addition, by subtracting the play time of the music program obtained with the cluster number and the sector number measured from the beginning of each music program from the play time of the music program obtained with the numbers of clusters and sectors of the music program or by subtracting the relative cluster number and the relative sector number measured from the beginning of the music program from the numbers of clusters and sectors of the music program and then by converting the resultant information into time information, the remaining time of the music program being reproduced can be obtained. In addition, by subtracting the time of music programs obtained with the numbers of clusters and sectors of music programs which have been reproduced from the total elapsed time obtained with the total numbers of clusters and sectors or by subtracting the numbers of clusters and sectors of music programs which have been reproduced from the total numbers of sectors and clusters and then converting the resultant information into time information, the remaining time can be obtained. The remaining time is displayed on the display 9.

The conversion from the numbers of clusters and sectors into time information can be performed in the following manner. As described above, one cluster consists of 36 sectors. Data is recorded to 32 sectors. On a mini disc, 512 samples, namely, 512×16×⅔=2048 bytes are compressed to 424 bytes. Thus, the compression ratio is 2048/424=256/53. Since the read time of one sector is 1/75 seconds, the real reproduction time of data of one sector is 1/75×256/53=256/3975. Thus, the conversion from the numbers of clusters and sectors into time information is obtained as follows.

$$(X \times 32 + Y) \times 256/3975$$

where X is the number of clusters; Y is the number of sectors; and one cluster consists of 32 sectors.

By software which accomplishes the above expression, information about numbers of clusters and sectors is converted into time information. However, the above expression contains an arithmetic operation of (256/3975), namely a multiplication of one byte and a division of two bytes. Thus, the software process takes a comparatively long operation time. When these arithmetic operations are rounded, errors are cumulated and thereby correct time information cannot be displayed. To solve these problems, the above expression can be accomplished with a table. However, to accomplish the desired number of clusters, twelve bits are required. To accomplish the desired number of sectors, five bits are required. Thus, to form a table according to the above expression, a ROM with many bits is required.

Figure 5:
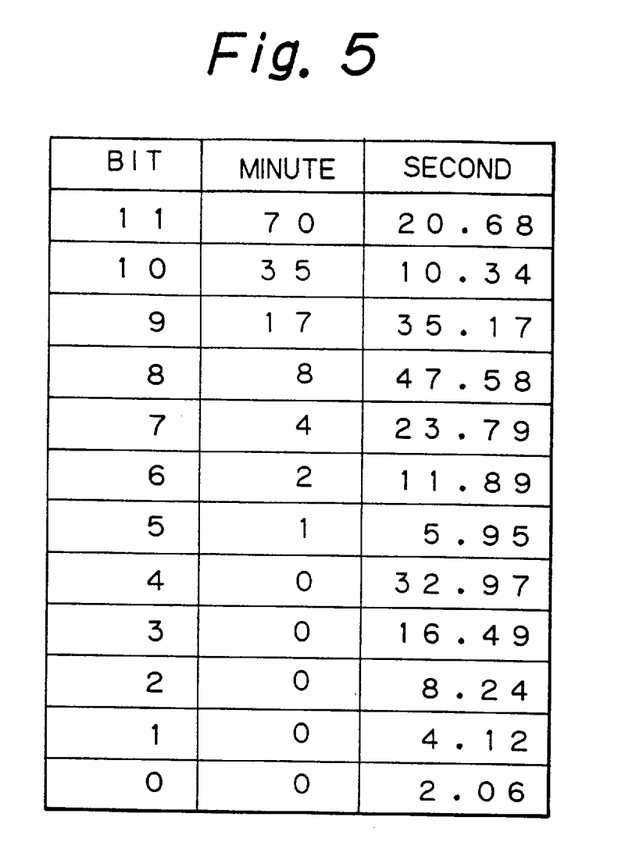
FIG. 5 is a schematic diagram for explaining a first embodiment of a table for use with the present invention.
Figure 6:
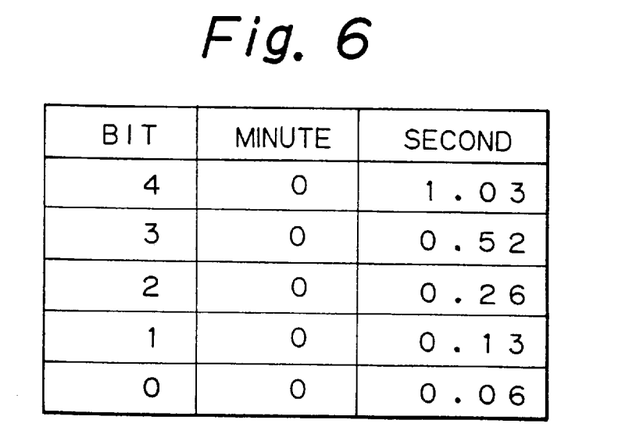
FIG. 6 is a schematic diagram for explaining the first embodiment of a table for use with the present invention.

Therefore, according to the present invention, cluster numbers and sector numbers are represented with binary numbers in the system controller 17, as shown in FIGS. 5 and 6. There is provided a memory 19 in which tables where each bit of the cluster numbers and the sector numbers represented with binary numbers is converted into a time value. FIG. 5 shows a table which represents cluster numbers in binary notation and corresponding times. For example, when a cluster number in binary notation is 1xxxxxxxxxxx, minute column and second column according to bit 11 are referenced on the table in the memory 19 on the table in the memory 19. Thus, 70 minutes and 20.68 seconds are obtained. For other bits, the time corresponding to a cluster number is obtained. By adding the time of each bit, the time according to the cluster number is obtained. For example, when the cluster number is (100000000001), the minute and second columns according to bit 11 are referenced on the table in the memory 19. Thus, 70 minutes and 20.68 seconds are obtained. In addition, the minute and second columns according to bit 0 are referenced on the table in the memory 19. Thus, 0 minute and 2.06 seconds are obtained. By adding these values in the system controller 17, a time (70 minutes and 22.74 seconds) is obtained.

FIG. 6 is a table in the memory 19 representing times corresponding to sector numbers in binary notation. Since the maximum number of sectors is 32, it can be represented with five bits. A time corresponding to each sector can be obtained in the same manner as a time corresponding to each cluster number.

Thus, a time corresponding to a cluster number converted into data represented with 12 bits can be obtained with a table having 12 lines in the memory 19 in the system controller 17. On the other hand, a time corresponding to a sector number converted into data represented with five bits can be obtained with a table having five lines in the memory 19 in the system controller 17.

A time corresponding to a cluster number and a sector number can be obtained by adding a time corresponding to a cluster number obtained by the table shown in FIG. 5 and a time corresponding to a sector number obtained by the table shown in FIG. 6 in the system controller 17.

As described above, a cluster number and a sector number are represented in binary notation. A table which contains a time corresponding to each bit is provided. A cluster number which is represented with 12 bits is divided into higher six bits and lower six bits. Two tables which output times according to the higher six bits and the lower six bits are provided. A table which outputs a time corresponding to the number of sectors represented with five bits is provided. By addition of the outputs of these tables, a time can be obtained. When a cluster number is divided into higher six bits and lower six bits, since the number of bits of the input becomes six bits, the number of entries of the table becomes 64. Thus, the hardware scale does not increase.

In addition, the conversion from a cluster number and a sector number into a time information can be accomplished in the following manner. As described above, one cluster consists of 36 sectors. Data is recorded to 32 of 36 sectors.

On the other hand, the sampling frequency of the above-mentioned optical disc is 44.1 kHz. 512 samples of data are treated as one sound group. In addition, one sector consists of 5.5 sound groups.

Thus, a reproduction time of one sound group, a reproduction time of one sector, and a reproduction time of one cluster can be obtained as follows:

Reproduction time of one sound group=$512/(44.1 \times 1000)$

Reproduction time of one sector=$\{512/(44.1 \times 1000)\} \times 5.5$

Reproduction time of one cluster=$\{512/(44.1 \times 1000)\} \times 176$

Thus, the conversion from a cluster number and a sector number into a time is given by the following expression.

$$(X \times 32 + Y) \times 512/(44.1 \times 1000)$$

where X is the number of clusters; Y is the number of sectors; and one cluster consists of 32 sectors.

The minimum unit of calculations is one sector. This is because fractions which are smaller than one sector are smaller than one second which is the minimum unit of display.

Figure 7:
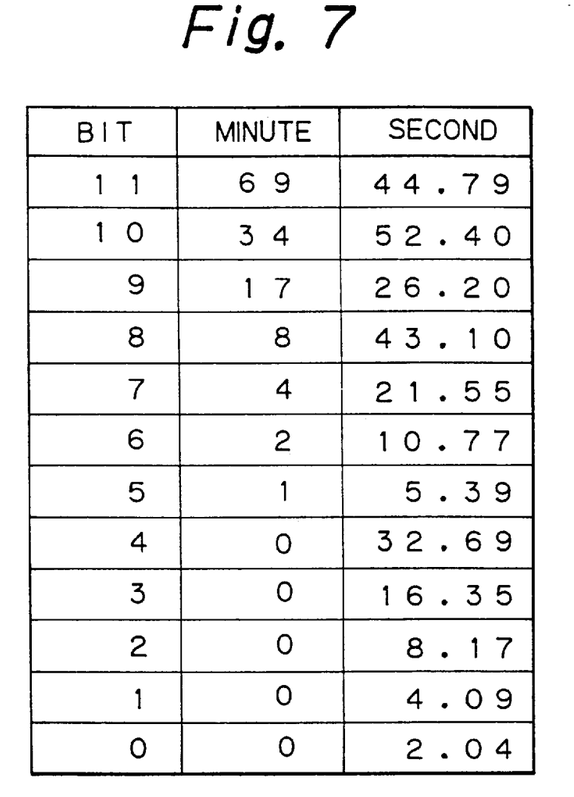
FIG. 7 is a schematic diagram for explaining a second embodiment of a table for use with the present invention.
Figure 8:
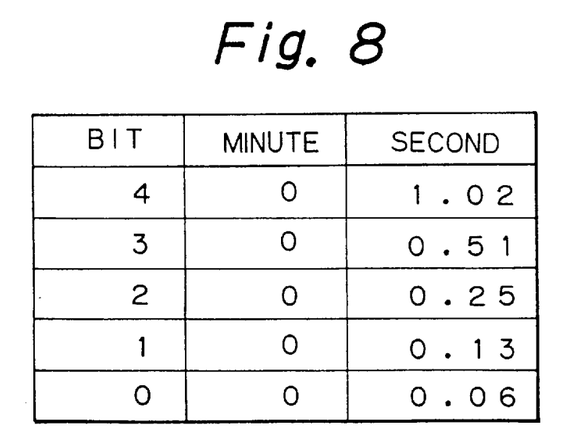
FIG. 8 is a schematic diagram for explaining the second embodiment of a table for use with the present invention.

Real calculations are performed with tables which are similar to those described above. A table shown in FIG. 7 accords with the table shown in FIG. 5. A table shown in FIG. 8 accords with the table shown in FIG. 6. With these tables, a cluster number and a sector number are converted into to a time.

What is claimed is:

1. A method for calculating a play time of a disc reproducing apparatus, said method comprising the steps of:

initially reading from the disc start addresses and stop addresses of each program recorded on a disc;

subtracting the start address of each program from the stop address of each program to determine the length of each program in sectors;

calculating a total number of clusters and sectors of each program from said length;

calculating a total number of clusters and sectors of all programs recorded on said disc according to said total number of clusters and sectors of each program; and converting said total number of clusters and sectors of each program and said total number of clusters and sectors of all programs into time information and displaying the time information.

2. The method as set forth in claim 1, wherein said conversion from said total number of clusters and sectors of each program and said total number of clusters and sectors of all programs into said time information is performed by means of a look-up table memory.

3. The method as set forth in claim 1, wherein said conversions from said total number of clusters and sectors of each program and said total number of clusters and sectors of all programs into said time information is performed according to the following expression:

$$(X \times 32 + Y) \times \frac{256}{3975}$$

where X is the number of clusters calculated; Y is the number of sectors calculated; and one cluster consists of 32 sectors.

4. The method as set forth in claim 1, wherein said conversion from said total number of clusters and sectors of each program and said total number of clusters and sectors of all programs into said time information is performed according to the following expression:

$$(X \times 32 + Y) \times \frac{512}{44.1 \times 1000}$$

where X is the number of clusters calculated; Y is the number of sectors calculated; and one cluster consists of 32 sectors.

5. A method for reproducing programs from a disc and calculating a remaining play time of programs being reproduced, said method comprising the steps of:
   initially reading from the disc a start address and a stop address of each program;
   reproducing programs from the disc and decompressing and decoding the reproduced programs;
   subtracting the start address of each program from the stop address of each program to determine the length of each program in sectors;
   calculating a total number of clusters and sectors of each program from said length;
   actually counting the number of clusters and sectors reproduced for each program as each program is being decompressed and decoded;
   calculating a number of remaining clusters and sectors of a particular program being reproduced by subtracting the number of clusters and sectors actually counted from the total number of clusters and sectors for that program;
   converting said number of remaining clusters and sectors into remaining play time information; and
   displaying said remaining play time information.

6. The method as set forth in claim 5, wherein said conversion from said number of remaining clusters and sectors into said time information is performed by means of a look-up table memory storing.

7. A method for reproducing programs from a disc and calculating a remaining play time of programs being reproduced, said method comprising the steps of:
   initially reading from the disc the start address and the stop address of each program recorded on a disc;
   reproducing programs from the disc and decompressing and decoding the reproduced programs;
   subtracting the start address for each program from the stop address of each program to determine the length of the program in sectors;
   calculating a total number of clusters and sectors of each program from said length;
   calculating a total number of clusters and sectors of all programs recorded on said disc by summing the total numbers of clusters and sectors of each program;
   calculating a total number of clusters and sectors of programs reproduced by actually counting and accumulating the number of clusters and sectors as each program is being decompressed and decoded;
   calculating a number of remaining clusters and sectors of the programs on said disc by subtracting the total number of clusters and sectors of programs reproduced from the total number of clusters and sectors of all programs recorded on said disc;
   converting said number of remaining clusters and sectors into time information; and
   displaying said time information.

8. The method as set forth in claim 7, wherein said conversion from said number of remaining clusters and sectors into said time information is performed by means of a look-up table memory.

9. The method as set forth in claim 7, wherein said conversion from said number of remaining clusters and sectors into said time information is performed according to the following expression:

$$(X \times 32 + Y) \times \frac{256}{3975}$$

where X is the number of clusters; Y is the number of sectors; and one cluster consists of 32 sectors.

10. The method as set forth in claim 7, wherein said conversion from said number of remaining clusters and sectors into said time information is performed according to the following expression:

$$(X \times 32 + Y) \times \frac{512}{44.1 \times 1000}$$

where X is the number of clusters; Y is the number of sectors; and one cluster consists of 32 sectors.

11. An apparatus for calculating a play time of a disc reproducing apparatus, the apparatus comprising:
   means for initially reading from the disc start addresses and stop addresses of each program recorded on a disc;
   means for subtracting the start address of each program from the stop address of each program to determine the length of the program in sectors;
   means for calculating the total number of clusters and sectors of each program from said length;
   means for calculating a total number of clusters and sectors of all programs recorded on the disc according to the total number of clusters and sectors of each program; and
   means for converting the total number of clusters and sectors of each program and the total number of clusters and sectors of all programs into time information and displaying the time information.

12. An apparatus as set forth in claim 11, wherein the means for converting the total number of clusters and sectors of each program and the total number of clusters and sectors of all programs into the time information includes a look-up table memory.

13. An apparatus as set forth in claim 11, wherein the means for converting the total number of clusters and sectors of each program and the total number of clusters and sectors of all programs into the time information performs conversion according to the following expression:

$$(X \times 32 + Y) \times \frac{256}{3975}$$

where X is the number of clusters calculated; Y is the number of sectors calculated; and one cluster consists of 32 sectors.

14. An apparatus as set forth in claim 11, wherein the means for converting the total number of clusters and sectors of each program and the total number of clusters and sectors of all programs into the time information performs conversion according to the following expression:

$$(X \times 32 + Y) \times \frac{512}{44.1 \times 1000}$$

where X is the number of clusters calculated; Y is the number of sectors calculated; and one cluster consists of 32 sectors.

15. An apparatus for reproducing programs recorded on a disc and calculating a remaining play time of programs being reproduced, the apparatus comprising:

means for initially reading from the disc a start address and a stop address of each program;

means for reproducing programs from the disc and decompressing and decoding the reproduced programs;

means for subtracting the start address of each program from the stop address of each program to determine the length of the program in sectors;

calculating a total number of clusters and sectors of each program from said length;

means for actually counting the number of clusters and sectors reproduced for each program as each program is being decompressed and decoded;

means for calculating a number of remaining clusters and sectors of a particular program being reproduced by subtracting the number of clusters an d sectors actually counted from the total number of clusters and sectors for that program;

means for converting the number of remaining clusters and sectors into remaining play time information; and means for displaying the remaining play time information.

16. An apparatus as set forth in claim 15, wherein the means for converting the number of remaining clusters and sectors into the time information includes a look-up table memory storing.

17. An apparatus for reproducing a disc and for calculating a remaining play time of programs on the disc, the apparatus comprising:

means for initially reading from the disc a start address and a stop address of each program;

means for reproducing programs from the disc and decompressing and decoding the reproduced programs;

means for subtracting the start address for each program from the stop address of each program to determine the length of the program in sectors;

calculating a total number of clusters and sectors of each program from said length;

means for calculating a total number of clusters and sectors of all programs recorded on the disc by summing the total numbers of clusters and sectors of each program;

means for calculating a total number of clusters and sectors of programs reproduced by actually counting and accumulating the number of clusters and sectors as each program is being decompressed and decoded;

means for calculating a number of remaining clusters and sectors of the programs on the disc by subtracting the total number of clusters and sectors of programs reproduced from the total number of clusters and sectors of all programs recorded on the disc;

means for converting the number of remaining clusters and sectors into time information; and means for displaying the time information.

18. An apparatus as set forth in claim 17, wherein the means for converting the number of remaining clusters and sectors into the time information includes a look-up table memory.

19. An apparatus as set forth in claim 17, wherein the means for converting the number of remaining clusters and sectors into the time information performs conversion according to the following expression:

$$(X \times 32 + Y) \times \frac{256}{3975}$$

where X is the number of clusters; Y is the number of sectors; and one cluster consists of 32 sectors.

20. An apparatus as set forth in claim 17, wherein the means for converting the number of remaining clusters and sectors into the time information performs conversion according to the following expression:

$$(X \times 32 + Y) \times \frac{512}{44.1 \times 1000}$$

where X is the number of clusters; Y is the number of sectors; and one cluster consists of 32 sectors.

21. A method for calculating a play time of a disc reproducing apparatus, said method comprising the steps of:

initially reading from the disc start addresses and stop addresses of each program recorded on a disc;

subtracting the start address of each program from the stop address of each program to determine the length of each program;

calculating a total number of clusters and sectors of each program from said length;

calculating a total number of clusters and sectors of all programs recorded on said disc according to said total number of clusters and sectors of each program; and converting said total number of clusters and sectors of each program and said total number of clusters and sectors of all programs into time information and displaying the time information.

22. The method as set forth in claim 21, wherein said conversion from said total number of clusters and sectors of each program and said total number of clusters and sectors of all programs into said time information is performed by means of a look-up table memory.

23. The method as set forth in claim 21, wherein said conversions from said total number of clusters and sectors of each program and said total number of clusters and sectors of all programs into said time information is performed according to the following expression:

$$(X \times 32 + Y) \times \frac{256}{3975}$$

where X is the number of clusters calculated; Y is the number of sectors calculated; and one cluster consists of 32 sectors.

24. The method as set forth in claim 21, wherein said conversion from said total number of clusters and sectors of each program and said total number of clusters and sectors of all programs into said time information is performed according to the following expression:

$$(X \times 32 + Y) \times \frac{512}{44.1 \times 1000}$$

where X is the number of clusters calculated; Y is the number of sectors calculated; and one cluster consists of 32 sectors.

25. A method for reproducing programs from a disc and calculating a remaining play time of programs being reproduced, said method comprising the steps of:

initially reading from the disc a start address and a stop address of each program;
   reproducing programs from the disc and decompressing and decoding the reproduced programs;
   subtracting the start address of each program from the stop address of each program to determine the length of each program;
   calculating a total number of clusters and sectors of each program from said length;
   actually counting the number of clusters and sectors reproduced for each program as each program is being decompressed and decoded;
   calculating a number of remaining clusters and sectors of a particular program being reproduced by subtracting the number of clusters and sectors actually counted from the total number of clusters and sectors for that program;
   converting said number of remaining clusters and sectors into remaining play time information; and
   displaying said remaining play time information.

26. The method as set forth in claim 25, wherein said conversion from said number of remaining clusters and sectors into said time information is performed by means of a look-up table memory storing.

27. A method for reproducing programs from a disc and calculating a remaining play time of programs being reproduced, said method comprising the steps of:

initially reading from the disc the start address and the stop address of each program recorded on a disc;
   reproducing programs from the disc and decompressing and decoding the reproduced programs;
   subtracting the start address for each program from the stop address of each program to determine the length of the program;
   calculating a total number of clusters and sectors of each program from said length;
   calculating a total number of clusters and sectors of all programs recorded on said disc by summing the total numbers of clusters and sectors of each program;
   calculating a total number of clusters and sectors of programs reproduced by actually counting and accumulating the number of clusters and sectors as each program is being decompressed and decoded;
   calculating a number of remaining clusters and sectors of the programs on said disc by subtracting the total number of clusters and sectors of programs reproduced from the total number of clusters and sectors of all programs recorded on said disc;
   converting said number of remaining clusters and sectors into time information; and
   displaying said ti me information.

28. The method as set forth in claim 27, wherein said conversion from said number of remaining clusters and sectors into said time information is performed by means of a look-up table memory.

29. The method as set forth in claim 27, wherein said conversion from said number of remaining clusters and sectors into said time information is performed according to the following expression:

$$(X \times 32 + Y) \times \frac{256}{3975}$$

where X is the number of clusters; Y is the number of sectors; and one cluster consists of 32 sectors.

30. The method as set forth in claim 27, wherein said conversion from said number of remaining clusters and sectors into said time information is performed according to the following expression:

$$(X \times 32 + Y) \times \frac{512}{44.1 \times 1000}$$

where X is the number of clusters; Y is the number of sectors; and one cluster consists of 32 sectors.

31. An apparatus for calculating a play time of a disc reproducing apparatus, the apparatus comprising:

means for initially reading from the disc start addresses and stop addresses of each program recorded on a disc;
   means for subtracting the start address of each program from the stop address of each program to determine the length of the program;
   means for calculating the total number of clusters and sectors of each program from said length;
   means for calculating a total number of clusters and sectors of all programs recorded on the disc according to the total number of clusters and sectors of each program; and
   means for converting the total number of clusters and sectors of each program and the total number of clusters and sectors of all programs into time information and displaying the time information.

32. An apparatus as set forth in claim 31, wherein the means for converting the total number of clusters and sectors of each program and the total number of clusters and sectors of all programs into the time information includes a look-up table memory.

33. An apparatus as set forth in claim 31, wherein the means for converting the total number of clusters and sectors of each program and the total number of clusters and sectors of all programs into the time information performs conversion according to the following expression:

$$(X \times 32 + Y) \times \frac{256}{3975}$$

where X is the number of clusters calculated; Y is the number of sectors calculated; and one cluster consists of 32 sectors.

34. An apparatus as set forth in claim 31, wherein the means for converting the total number of clusters and sectors of each program and the total number of clusters and sectors of all programs into the time information performs conversion according to the following expression:

$$(X \times 32 + Y) \times \frac{512}{44.1 \times 1000}$$

where X is the number of clusters calculated; Y is the number of sectors calculated; and one cluster consists of 32 sectors.

35. An apparatus for reproducing programs recorded on a disc and calculating a remaining play time of programs being reproduced, the apparatus comprising:

means for initially reading from the disc a start address and a stop address of each program;

means for reproducing programs from the disc and decompressing and decoding the reproduced programs;

means for subtracting the start address of each program from the stop address of each program to determine the length of the program;

calculating a total number of clusters and sectors of each program from said length;

means for actually counting the number of clusters and sectors reproduced for each program as each program is being decompressed and decoded;

means for calculating a number of remaining clusters and sectors of a particular program being reproduced by subtracting the number of clusters and sectors actually counted from the total number of clusters and sectors for that program;

means for converting the number of remaining clusters and sectors into remaining play time information; and means for displaying the remaining play time information.

36. An apparatus as set forth in claim 35, wherein the means for converting the number of remaining clusters and sectors into the time information includes a look-up table memory storing.

37. An apparatus for reproducing a disc and for calculating a remaining play time of programs on the disc, the apparatus comprising:

means for initially reading from the disc a start address and a stop address of each program;

means for reproducing programs from the disc and decompressing and decoding the reproduced programs;

means for subtracting the start address for each program from the stop address of each program to determine the length of the program;

calculating a total number of clusters and sectors of each program from said length;

means for calculating a total number of clusters and sectors of all programs recorded on the disc by summing the total numbers of clusters and sectors of each program;

means for calculating a total number of clusters and sectors of programs reproduced by actually counting and accumulating the number of clusters and sectors as each program is being decompressed and decoded;

means for calculating a number of remaining clusters and sectors of the programs on the disc by subtracting the total number of clusters and sectors of programs reproduced from the total number of clusters and sectors of all programs recorded on the disc;

means for converting the number of remaining clusters and sectors into time information; and means for displaying the time information.

38. An apparatus as set forth in claim 37, wherein the means for converting the number of remaining clusters and sectors into the time information includes a look-up table memory.

39. An apparatus as set forth in claim 37, wherein the means for converting the number of remaining clusters and sectors into the time information performs conversion according to the following expression:

$$(X \times 32 + Y) \times \frac{256}{3975}$$

where X is the number of clusters; Y is the number of sectors; and one cluster consists of 32 sectors.

40. An apparatus as set forth in claim 37, wherein the means for converting the number of remaining clusters and sectors into the time information performs conversion according to the following expression:

$$(X \times 32 + Y) \times \frac{512}{44.1 \times 1000}$$

where X is the number of clusters; Y is the number of sectors; and one cluster consists of 32 sectors.

* * * * *